(12) United States Patent
Henley, Jr.

(10) Patent No.: US 7,603,838 B1
(45) Date of Patent: Oct. 20, 2009

(54) EDGING ATTACHMENT FOR A ROTARY LAWN MOWER

(76) Inventor: Horace Henley, Jr., 1417 FM 969, Bastrop, TX (US) 78602

( * ) Notice: Subject to any disclaimer, the term of this patent is extended or adjusted under 35 U.S.C. 154(b) by 0 days.

(21) Appl. No.: 12/074,490

(22) Filed: Mar. 3, 2008

(51) Int. Cl.
*A01D 34/00* (2006.01)
(52) U.S. Cl. ........................................ 56/13.7
(58) Field of Classification Search ............. 56/13.7, 56/17.1, 17.2, 17.4, 16.9; 172/14, 15
See application file for complete search history.

(56) References Cited

U.S. PATENT DOCUMENTS

| | | | |
|---|---|---|---|
| 3,003,301 A * | 10/1961 | Koon | 56/256 |
| 3,197,951 A | 8/1965 | Zick | |
| 3,421,300 A * | 1/1969 | Rhodes | 56/10.8 |
| 3,430,424 A | 3/1969 | Hasenbank | |
| 3,604,208 A | 9/1971 | Borunda | |
| 3,690,384 A | 9/1972 | Patterson | |
| 4,272,949 A | 6/1981 | Franks et al. | |
| 4,718,221 A * | 1/1988 | Wessel et al. | 56/16.9 |
| 4,852,658 A * | 8/1989 | Wessel et al. | 172/14 |
| 5,065,567 A * | 11/1991 | Wessel et al. | 56/13.7 |
| 5,179,823 A | 1/1993 | Pace | |
| 5,497,606 A | 3/1996 | Baxter | |
| 6,125,943 A * | 10/2000 | Valois | 172/15 |
| D576,643 S * | 9/2008 | Blotsky | D15/17 |

* cited by examiner

*Primary Examiner*—Árpád Fábián-Kovács
(74) *Attorney, Agent, or Firm*—Richard L. Miller

(57) ABSTRACT

An edging attachment for a rotary lawn mower having a housing with a side wall and a cutting blade. The edging attachment comprises a flat bracket having a forward override angular edge. A mechanism is for mounting the flat bracket to the housing, so that it will extend down in a vertical position against the side wall, whereby the forward override angular edge will ride over obstructions on a lawn. A mechanism is for forcing grass on the lawn to move downwardly under the side wall towards the cutting blade to cut the grass. A mechanism is for deflecting the rotary lawn mower away from fences and other projections on the lawn. A guide assembly is adjustably connected vertically to the flat bracket, so that it can be pivotally retained in an upper inoperative position and a lower operative position. When in the lower operative position the guide assembly can travel between an edge of a concrete sidewalk and the lawn, in which the cutting blade will evenly cut the grass nearest to the edge of the concrete sidewalk.

4 Claims, 4 Drawing Sheets

EDGING ATTACHMENT FOR A ROTARY LAWN MOWER

BACKGROUND OF THE INVENTION

1. Field of the Invention

The present invention relates to a lawn edger, and more particularly, an edging attachment for a rotary lawn mower.

2. Description of the Prior Art

Numerous innovations for lawn mower attachments have been provided in the prior art that will be described. Even though these innovations may be suitable for the specific individual purposes to which they address, however, they differ from the present invention.

A FIRST EXAMPLE, U.S. Pat. No. 3,197,951, Issued on Aug. 3, 1965, to Zick teaches an attachment for a lawn mower comprising a twisted blade having a substantially flat vertical portion, a laterally and forwardly inclined portion, and a generally horizontal tip, a mounting bracket, guide means adapted to hold said blade in vertically reciprocable relation to said bracket, and a pivotal connection between said guide means and said mounting bracket, said pivotal connection being adapted to permit said blade to swing in an arc between a lower operative position and an upper inoperative position, said mounting bracket including a vertical flange and a mounting plate normal to said flange, said guide means comprising a tube, said blade having a shaft vertically reciprocable in said tube, said tube being provided with a vertical slot and said shaft being provided with a stop pin extending into said slot, and a spring within said tube and bearing on said shaft adapted to urge said shaft downwardly in said tube.

A SECOND EXAMPLE, U.S. Pat. No. 3,430,424, Issued on Mar. 4, 1969, to Hasenbank teaches an edging blade mounted on a rotary mower forwardly of the axis of rotation of the cutting blade and lying in a plane intersecting the cutting orbit of the cutting blade, the edging member having a lower forwardly tapered blade portion with an upwardly and rearwardly inclined leading knife edge which is selectively vertically adjustable to positions below and/or above the level of the mower wheels. The inclined leading edge lifts and elevates low lying grass along the edge of a lawn and delivers it to the cutting blade of the mower in a generally upright condition for cutting by the blade.

A THIRD EXAMPLE, U.S. Pat. No. 3,604,208, Issued on Sep. 14, 1971, to Borunda teaches a lawn care apparatus, and more particularly to a combination mower/edger. Both units are driven by a single motor and can be operated either singly or in combination. The edger portion is simplified by being driven by a flexible shaft and is adapted to be positioned on either side of the mower, depending upon the convenience of the operator. Moreover, the edger may be tilted relative to the mower for a desired angle of edging, or to compensate for the slope of the ground.

A FOURTH EXAMPLE, U.S. Pat. No. 3,690,384, Issued on Sep. 12, 1972, to Patterson teaches a combined lawn mower and edger, the edger providing means for edging or trimming along driveways, walks, curbs, flower beds, trees and the like, and being readily attached to or detached from a lawn mower. The edger blade assembly of the edger is secured to one end of an edger shaft rearwardly and laterally of the wheeled carriage of the lawn mower and arranged to rotate at all times in a substantially vertical plane clear of the ground when all wheels of the carriage are in contact with the ground and the edger is in a normally non-edging position spaced from the soil. The edger blade assembly is lowered, guided and raised, as desired, from a normally non-edging position, wherein the edger blade assembly is spaced from the soil, to an edging position, wherein the edger blade assembly engages the soil, while the motor is in operation, by pivoting the carriage of the lawn mower on its rear wheels.

A FIFTH EXAMPLE, U.S. Pat. No. 4,272,949, Issued on Jun. 16, 1981, to Franks et al. teaches an elongated front to rear extending ramp or wedge member that is pivotally supported from the lower marginal edge portion of one side of a downwardly opening rotary lawn mower housing and angularly displaceable about an axis extending transversely of the housing and the wedge member between an operative forwardly and downwardly inclined position and a raised horizontal position. The wedge member, when in the forwardly and downwardly inclined operative position and moving along a marginal edge of the lawn area being cut, is operative to slide beneath and upwardly straightened blades of grass lying over a curb, walk, or driveway bordering the aforementioned marginal edge so that the raised blades of grass may be cut by the blade of the rotary mower. A Bowden cable is operatively connected between the wedge member and the rotary mower housing and may be remotely operated to swing the wedge member between the raised inoperative position and the lowered operative position. The wedge member underlies the adjacent periphery of the circular path through which the outer peripheral portions of the rotary blade swing and includes a forward edge inner side depending flange which may engage and be guided along a curb, walk or driveway structure.

A SIXTH EXAMPLE, U.S. Pat. No. 5,179,823, Issued on Jan. 19, 1993, to Pace teaches a motor-powered mulching mower and edger apparatus with dual rotary mower blades, a mower deck and a side-mounted edger attachment adapted by a clutch mechanism for simultaneous operation therewith. An adjustable mulching control valve mounted at the inlet of a discharge chute from the deck allows variation of the proportions of mulching to clippings bagging in the range of zero to one hundred percent during mower operation. The dual rotary blades are mounted in vertically spaced relation and select leading-angle trailing-angle relationship and are cooperable with an internal deck-mounted air stream deflector for deflecting multiple cuttings of grass clippings in an inwardly directed spiral path such that after the initial cutting, each of the clippings is disposed to at least two more cuttings to produce a finer mulch. The edger is provided with an edger blade guard which can be adjustably positioned to deflect and guide edger-produced clippings to the interior of the mower deck in an air stream which enforced the air stream generated by the mower blades and enhances vacuuming capability of the apparatus. Swivel-mounted castor wheels at the front of the mower deck and an off-set of the front wheel and real wheel nearest the edger towards the center line of the apparatus facilitates the operation of the edger in a curved path.

A SEVENTH EXAMPLE, U.S. Pat. No. 5,497,606, Issued on Mar. 12, 1996, to Baxter teaches an improved lawn mowing and edging apparatus wherein a generally conventional gasoline powered push mower or walk-behind mower is provided with an edger mounted on the front of the deck of the mower slightly outside of the track of one of the front wheels, the edger having a high speed rotating blade which lies in a vertical plane and which can be raised to an inoperative position or lowered to an operative position. The edger is provided with a very simple belt and pulley drive which causes the edger to be powered only in its lowered position and which derives its motive power from a power-take-off extending outward from the lawnmower engine substantially at right angles to the direction of travel of the mower. The power-take-off shaft is thereby substantially parallel to the shaft of the edger and a simple trouble free and safe power drive mechanism can be provided for the edger. The engine power-take-off preferably has a gear ratio to rotate at between ⅔ and ¼ of the speed of the main vertical mowing blade shaft so that a single belt drive may readily provide adequate speed increase for the effective operation of the edger; the speed of the power-take-off shaft also makes it suitable, with speed reduction, to provide a drive for the lawnmower wheels if desired. The edger is provided with pivotally yieldable blades to minimize damage upon striking of rocks or other objects; the blades may be either metal or plastic.

It is apparent now that numerous innovations for lawn mower attachments have been provided in the prior art that are adequate for various purposes. Furthermore, even though these innovations may be suitable for the specific individual purposes to which they address, accordingly, they would not be suitable for the purposes of the present invention as heretofore described.

SUMMARY OF THE INVENTION

AN OBJECT of the present invention is to provide an edging attachment for a rotary lawn mower that avoids the disadvantages of the prior art.

ANOTHER OBJECT of the present invention is to provide an edging attachment for a rotary lawn mower that is simple and inexpensive to manufacture.

STILL ANOTHER OBJECT of the present invention is to provide an edging attachment for a rotary lawn mower that is simple to use.

BRIEFLY STATED, STILL YET ANOTHER OBJECT of the present invention is to provide an edging attachment for a rotary lawn mower having a housing with a side wall and a cutting blade. The edging attachment comprises a flat bracket having a forward override angular edge. A mechanism on the flat bracket is for mounting the flat bracket to the housing. The flat bracket will extend down in a vertical position against the side wall of the housing, whereby the forward override angular edge will cause the flat bracket to ride over obstructions on a lawn. A mechanism on the flat bracket is for forcing grass on the lawn to move downwardly under the side wall of the housing towards the cutting blade, so that the cutting blade will cut the grass. A mechanism on the flat bracket is for deflecting the rotary lawn mower away from fences and other projections on the lawn. A guide assembly is adjustably connected vertically to the flat bracket. The guide assembly can be pivotally retained in an upper inoperative position and a lower operative position. When the guide assembly is in the lower operative position it can travel between an edge of a concrete sidewalk and the lawn, in which the cutting blade of the rotary lawn mower will evenly cut the grass nearest to the edge of the concrete sidewalk.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawings are briefly described as follows.

Figure 1:
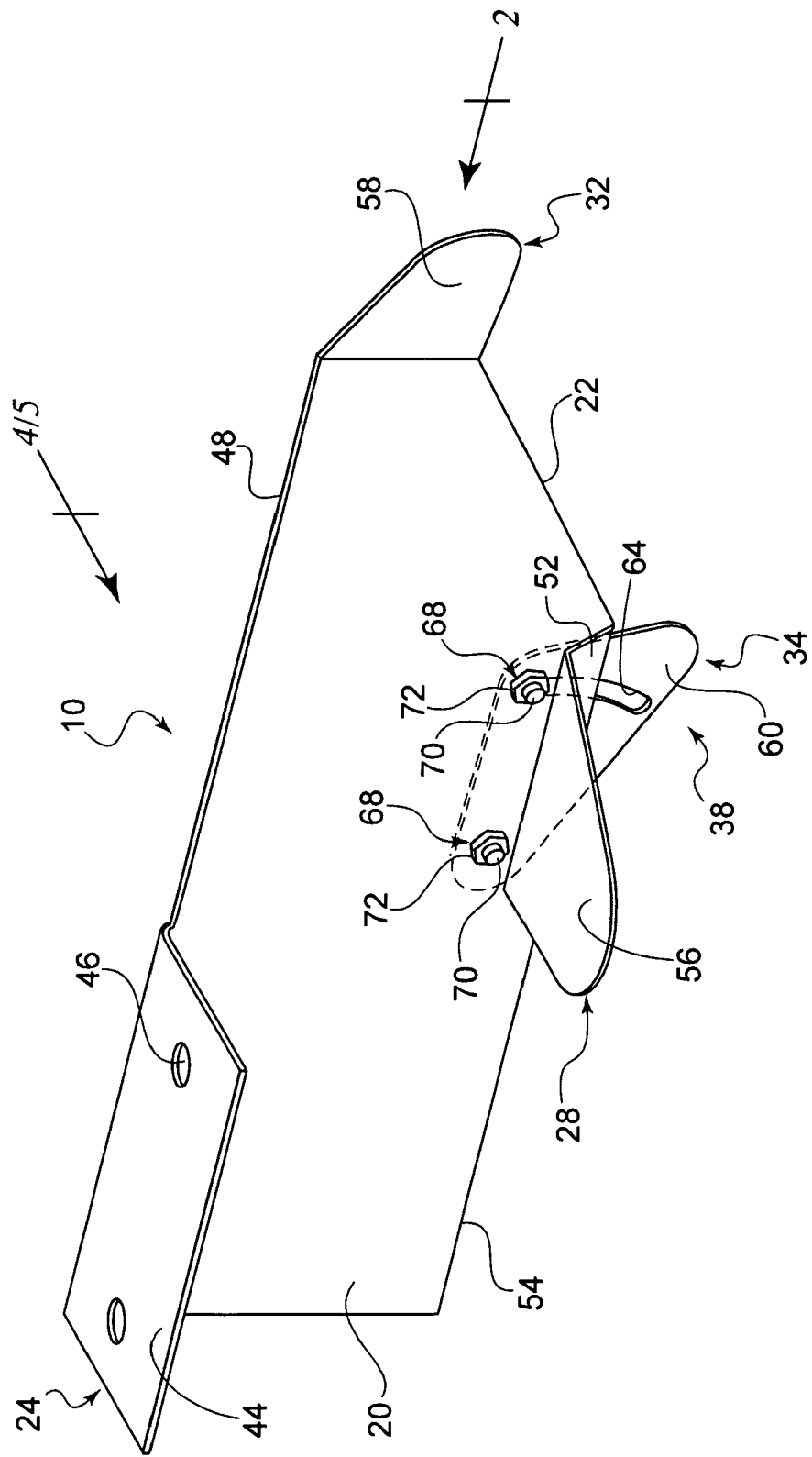
FIG. 1 is a diagrammatic left side perspective view of an embodiment of the present invention.
Figure 2:
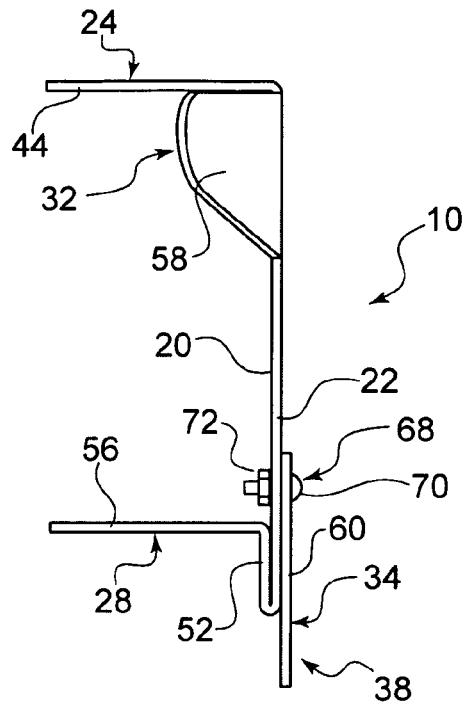
FIG. 2 is a front elevational view of the present invention taken in the direction of arrow 2 in FIG. 1.
Figure 3:
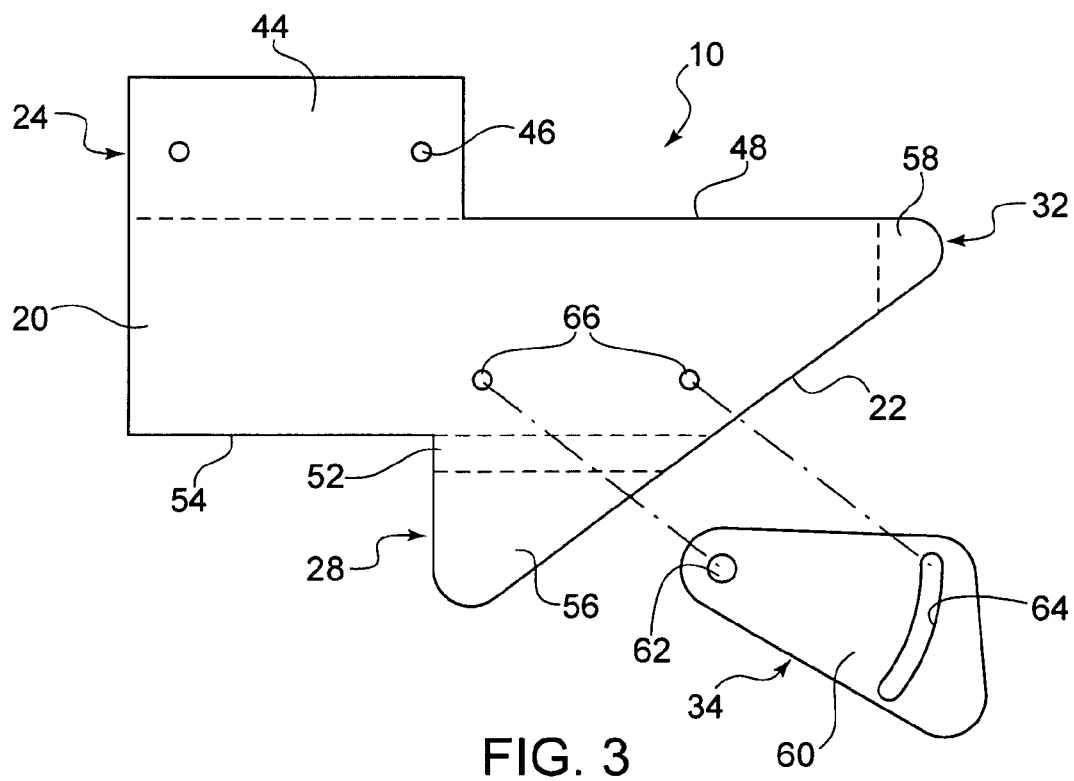
FIG. 3 is a left side plan view of a pattern which forms the present invention before folding occurs on the fold lines.
Figure 4:
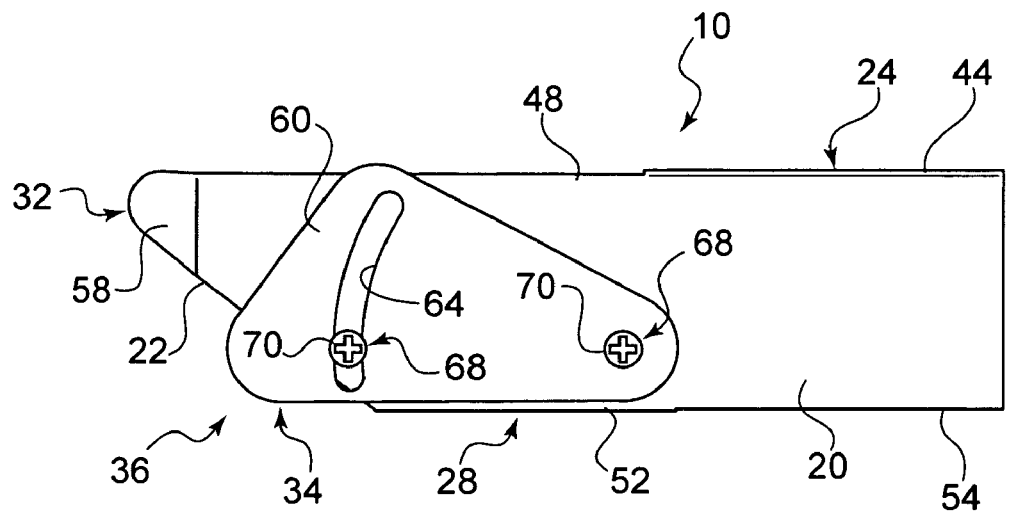
FIG. 4 is a right side elevational view of the present invention taken in direction of arrow 4 in FIG. 1, showing the guide assembly in an upper inoperative position.
Figure 5:
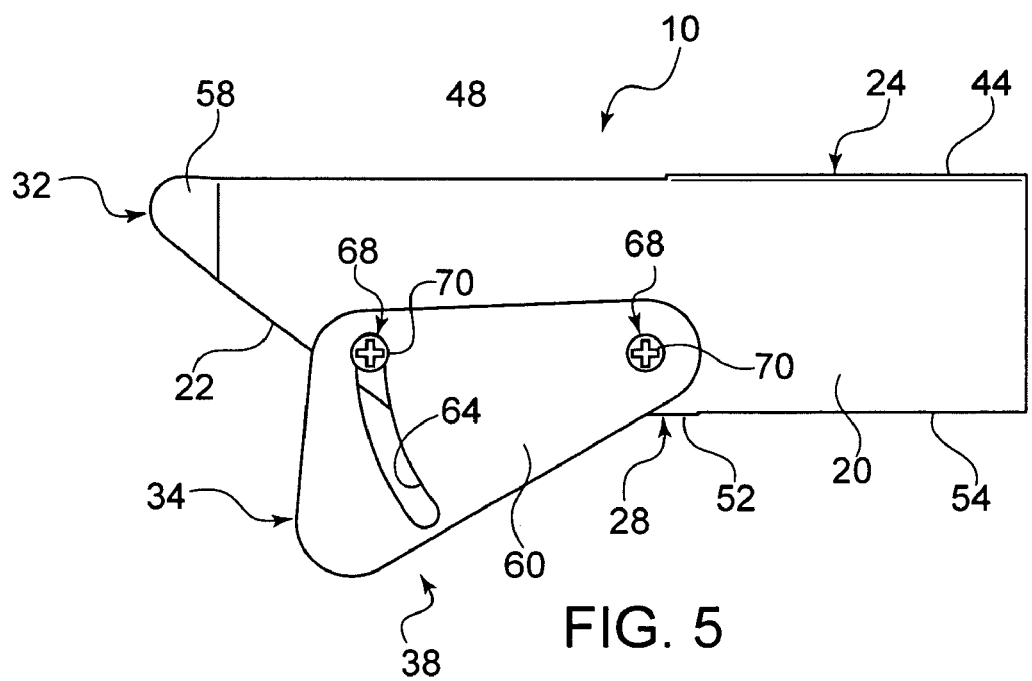
FIG. 5 is a right side elevational view of the present invention taken in direction of arrow 5 in FIG. 1, showing the guide assembly in a lower operative position.

A MARSHALING OF REFERENCE NUMERALS UTILIZED IN THE DRAWING 10 edging attachment
12 rotary lawn mower
14 housing of rotary lawn mower 12
16 side wall of housing 14
18 cutting blade of rotary lawn mower 12
20 flat bracket of edging attachment 10
22 forward override angular edge of flat bracket 20
24 mounting mechanism of edging attachment 10
26 lawn
28 grass forcing mechanism of edging attachment 10
30 grass of lawn 26
32 deflecting mechanism of edging attachment 10
34 guide assembly of edging attachment 10
36 upper operative position of guide assembly 34
38 lower inoperative position of guide assembly 34
40 edge of concrete sidewalk 42
42 concrete sidewalk
44 flange for mounting mechanism 24
46 mounting hole in flange 44
48 top edge of flat bracket 20
50 screw
52 projection member of grass forcing mechanism 28
54 bottom edge of flat bracket 20
56 gathering arm of grass forcing mechanism 28
58 plate tip for deflecting mechanism 32
60 flat plate of guide assembly 34
62 pivot hole in flat plate 60
64 curved slot in flat plate 60
66 aperture in flat bracket 20
68 fastener of guide assembly 34
70 bolt of fastener 68
72 nut of fastener 68

DETAILED DESCRIPTION OF THE PREFERRED EMBODIMENT

Figure 6:
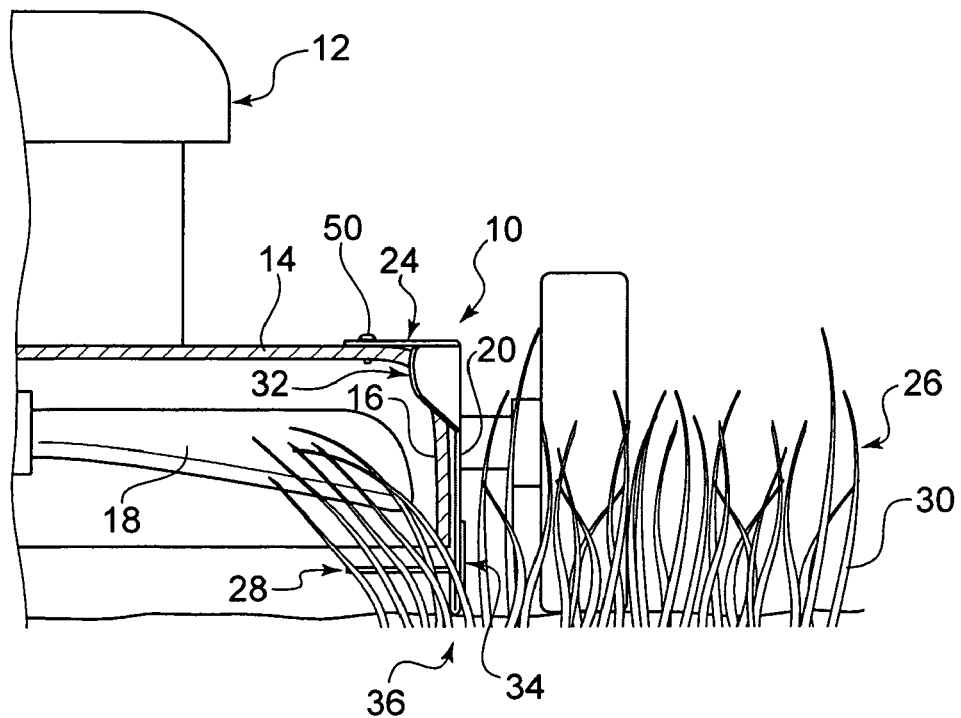
FIG. 6 is a diagrammatic front cross sectional view of a rotary lawn mower, with parts broken away, showing the present invention installed thereon, with the guide assembly in the upper inoperative position for cutting grass on a lawn.
Figure 7:
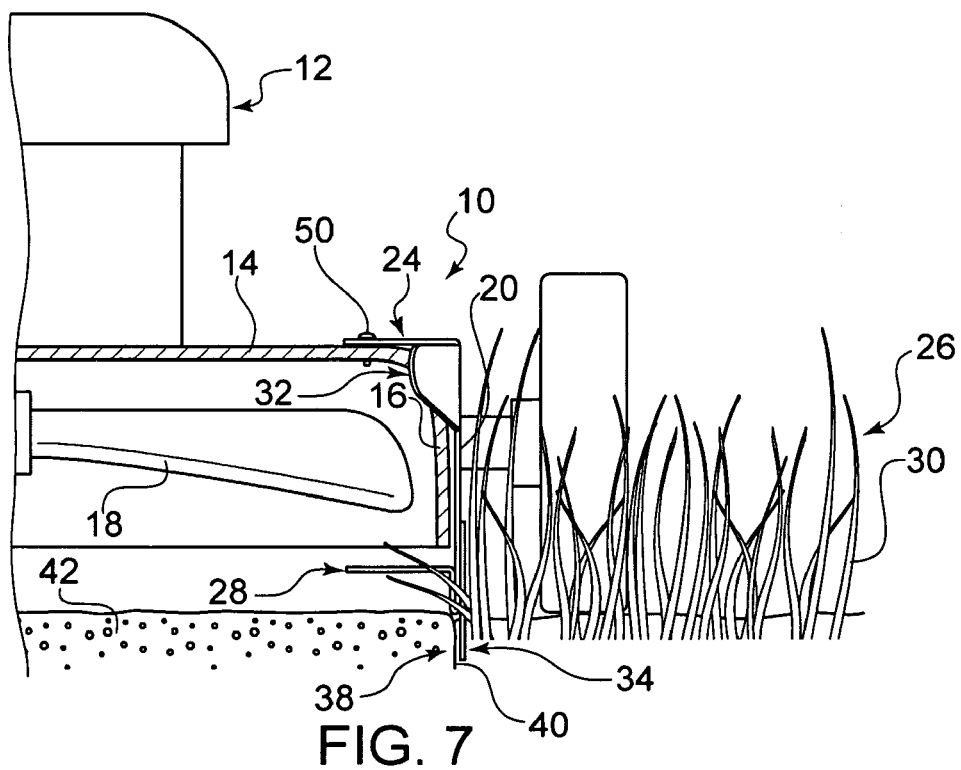
FIG. 7 is a diagrammatic front cross sectional view similar to FIG. 6, of the rotary lawn mower, with parts broken away, showing the present invention installed thereon, but with the guide assembly in the lower operative position for cutting grass on the lawn next to a concrete sidewalk.

Referring now to the figures, in which like numerals indicate like parts, and particularly to FIGS. 1 through 7, which are a diagrammatic left side perspective view of an embodiment of the present invention; a front elevational view of the present invention taken in the direction of arrow 2 in FIG. 1; a left side plan view of a pattern which forms the present invention before folding occurs on the fold lines; a right side elevational view of the present invention taken in direction of arrow 4 in FIG. 1, showing the guide assembly in an upper inoperative position; a right side elevational view of the present invention taken in direction of arrow 5 in FIG. 1, showing the guide assembly in a lower operative position; a diagrammatic front cross sectional view of a rotary lawn mower, with parts broken away, showing the present invention installed thereon, with the guide assembly in the upper inoperative position for cutting grass on a lawn; and a diagrammatic front cross sectional view similar to FIG. 6, of the rotary lawn mower, with parts broken away, showing the present invention installed thereon, but with the guide assembly in the lower operative position for cutting grass on the lawn next to a concrete sidewalk, and as such, will be discussed with reference thereto.

The present invention is an edging attachment 10 for a rotary lawn mower 12 having a housing 14 with a side wall 16 and a cutting blade 18. The edging attachment 10 comprises a flat bracket 20 having a forward override angular edge 22. A mechanism 24 on the flat bracket 20 is for mounting the flat bracket 20 to the housing 14. The flat bracket 20 will extend down in a vertical position against the side wall 16 of the housing 14, whereby the forward override angular edge 22 will cause the flat bracket 20 to ride over obstructions on a lawn 26.

A mechanism 28 on the flat bracket 20 is for forcing grass 30 on the lawn 26 to move downwardly under the side wall 16 of the housing 14 towards the cutting blade 18, so that the cutting blade 18 will cut the grass 30. A mechanism 32 on the flat bracket 20 is for deflecting the rotary lawn mower 12 away from fences and other projections on the lawn 26.

A guide assembly 34 is adjustably connected vertically to the flat bracket 20. The guide assembly 34 can be pivotally retained in an upper inoperative position 36 and a lower operative position 38. When the guide assembly 34 is in the lower operative position 38 it can travel between an edge 40 of a concrete sidewalk 42 and the lawn 26, in which the cutting blade 18 of the rotary lawn mower 12 will evenly cut the grass 30 nearest to the edge 40 of the concrete sidewalk 42.

The mounting mechanism 24 comprises a flange 44 having at least one mounting hole 46. The flange 44 is integral with a top edge 48 of the flat bracket 20 and is folded horizontally at a ninety degree bend, so that the flange 44 can be attached with at least one screw 50 extending through the at least one mounting hole 46 and into top of the housing 14 of the rotary lawn mower 12.

The grass forcing mechanism 28 comprises a projection member 52 integral with a bottom edge 54 of the flat bracket 20 and folded vertically at a one hundred and eighty degree bend. The projection member 52 will contain the grass 30 under the side wall 16 of the housing 14. A gathering arm 56 is integral with the projection member 52 and folded horizontally at a ninety degree bend. The gathering arm 56 will force the grass 28 down towards the cutting blade 18 of the rotary lawn mower 12.

The deflecting mechanism 32 comprises a plate tip 58 integral with the flat bracket 20 between the forward override angular edge 22 and the top edge 48 and folded inwardly at a thirty degree bend.

The guide assembly 34 comprise a generally triangular shaped flat plate 60 having a pivot hole 62 and a curved slot 64 therein. The flat bracket 20 has two spaced apart apertures 66 therethrough above the grass forcing mechanism 28. A pair of fasteners 68 are provided. The first fastener 68 extends through the pivot hole 62 in the flat plate 60 and the first aperture 66 in the flat bracket 20. The second fastener 68 extends through the curved slot 64 in the flat plate 60 and the second aperture 68 in the flat bracket 20. Each fastener 68 comprises a bolt 70 and nut 72.

It will be understood that each of the elements described above, or two or more together, may also find a useful application in other types of constructions differing from the types described above.

While the invention has been illustrated and described as embodiments of an edging attachment for a rotary lawn mower, accordingly it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. An edging attachment for a rotary lawn mower having a housing with a side wall and a cutting blade, said edging attachment comprising:
    a) a flat bracket having a forward override angular edge;
    b) means on said flat bracket for mounting said flat bracket to the housing, so that said flat bracket will extend down in a vertical position against the side wall of the housing, whereby said forward override angular edge will cause said flat bracket to ride over obstructions on a lawn;
    c) means on said flat bracket for forcing grass on the lawn to move downwardly under the side wall of the housing towards the cutting blade, so that the cutting blade will cut the grass;
    d) means on said flat bracket for deflecting the rotary lawn mower away from fences; and
    e) a guide assembly adjustably connected vertically to said flat bracket, whereby said guide assembly can be pivotally retained in an upper inoperative position and a lower operative position, so that when said guide assembly is in the lower operative position it can travel between an edge of a concrete sidewalk and the lawn, in which the cutting blade of the rotary lawn mower will evenly cut the grass nearest to the edge of the concrete sidewalk, wherein said mounting means comprises a flange having at least one mounting hole, said flange integral with a top edge of said flat bracket and folded horizontally at a ninety degree bend, so that said flange can be attached with at least one screw extending through said at least one mounting hole and into top of the housing of the rotary lawn mower.

2. An edging attachment for a rotary lawn mower having a housing with a side wall and a cutting blade, said edging attachment comprising:
    a) a flat bracket having a forward override angular edge;
    b) means on said flat bracket for mounting said flat bracket to the housing, so that said flat bracket will extend down in a vertical position against the side wall of the housing, whereby said forward override angular edge will cause said flat bracket to ride over obstructions on a lawn;
    c) means on said flat bracket for forcing grass on the lawn to move downwardly under the side wall of the housing towards the cutting blade, so that the cutting blade will cut the grass;
    d) means on said flat bracket for deflecting the rotary lawn mower away from fences; and e) a guide assembly adjustable connected vertically to said flat bracket, whereby said guide assembly can be pivotally retained in an upper inoperative position and a lower operative position, so that when said guide assembly is in the lower operative position it can travel between an edge of a concrete sidewalk and the lawn, in which the cutting blade of the rotary lawn mower will evenly cut the grass nearest to the edge of the concrete sidewalk, wherein said grass forcing means comprises:
 i) a projection member integral with a bottom edge of said flat bracket and folded vertically at a one hundred and eighty degree bend, so that said projection member will contain the grass under the side wall of the housing; and
 ii) a gathering arm integral with said projection member and folded horizontally at a ninety degree bend, so that said gathering arm will force the grass down towards the cutting blade of the rotary lawn mower.

3. An edging attachment for a rotary lawn mower having a housing with a side wall and a cutting blade, said edging attachment comprising:
 a) a flat bracket having a forward override angular edge;
 b) means on said flat bracket for mounting said flat bracket to the housing, so that said flat bracket will extend down in a vertical position against the side wall of the housing, whereby said forward override angular edge will cause said flat bracket to ride over obstructions on a lawn;
 c) means on said flat bracket for forcing grass on the lawn to move downwardly under the side wall of the housing towards the cutting blade, so that the cutting blade will cut the grass;
 d) means on said flat bracket for deflecting the rotary lawn mower away from fences; and
 e) a guide assembly adjustable connected vertically to said flat bracket, whereby said guide assembly can be pivotally retained in an upper inoperative position and a lower operative position, so that when said guide assembly is in the lower operative position it can travel between an edge of a concrete sidewalk and the lawn, in which the cutting blade of the rotary lawn mower will evenly cut the grass nearest to the edge of the concrete sidewalk, wherein said deflecting means comprises a plate tip integral with said flat bracket between said forward override angular edge and said top edge and folded inwardly at a thirty degree bend.

4. An edging attachment for a rotary lawn mower having a housing with a side wall and a cutting blade, said edging attachment comprising:
 a) a flat bracket having a forward override angular edge;
 b) means on said flat bracket for mounting said flat bracket to the housing, so that said flat bracket will extend down in a vertical position against the side wall of the housing, whereby said forward override angular edge will cause said flat bracket to ride over obstructions on a lawn;
 c) means on said flat bracket for forcing grass on the lawn to move downwardly under the side wall of the housing towards the cutting blade, so that the cutting blade will cut the grass;
 d) means on said flat bracket for deflecting the rotary lawn mower away from fences; and
 e) a guide assembly adjustably connected vertically to said flat bracket, whereby said guide assembly can be pivotally retained in an upper inoperative position and a lower operative position, so that when said guide assembly is in the lower operative position it can travel between an edge of a concrete sidewalk and the lawn, in which the cutting blade of the rotary lawn mower will evenly cut the grass nearest to the edge of the concrete sidewalk;
 f) wherein said mounting means further comprises a flange having at least one mounting hole, said flange integral with a top edge of said flat bracket and folded horizontally at a ninety degree bend, so that said flange can be attached with at least one screw extending through said at least one mounting hole and into top of the housing of the rotary lawn mower;
 g) wherein said grass forcing means further comprises a projection member integral with a bottom edge of said flat bracket and folded vertically at a one hundred and eighty degree bend, so that said projection member will contain the grass under the side wall of the housing; and a gathering arm integral with said projection member and folded horizontally at a ninety degree bend, so that said gathering arm will force the grass down towards the cutting blade of the rotary lawn mower;
 h) wherein said deflecting means further comprises a plate tip integral with said flat bracket between said forward override angular edge and said top edge and folded inwardly at a thirty degree bend;
 i) wherein said guide assembly further comprises a generally triangular shaped flat plate having a pivot hole and a curved slot therein, and said flat bracket having two spaced apart apertures therethrough above said grass forcing means; and a pair of fasteners, in which said first fastener extends through said pivot hole in said flat plate and said first aperture in said flat bracket, and said second fastener extends through said curved slot in said flat plate and said second aperture in said flat bracket; and
 j) wherein each said fastener further comprises a bolt and nut.

\* \* \* \* \*